(12) United States Patent
Frattarelli et al.

(10) Patent No.: US 12,534,850 B2
(45) Date of Patent: Jan. 27, 2026

(54) COLOR STABLE TREATED FABRIC AND METHOD OF MAKING THE SAME

(71) Applicant: LANXESS Corporation, Pittsburgh, PA (US)

(72) Inventors: David L. Frattarelli, Collegeville, PA (US); Kevin B. Vargo, Collegeville, PA (US); Yunfei Yan, Shanghai (CN)

(*) Notice: Subject to any disclaimer, the term of this patent is extended or adjusted under 35 U.S.C. 154(b) by 676 days.

(21) Appl. No.: 16/468,571

(22) PCT Filed: Dec. 30, 2016

(86) PCT No.: PCT/CN2016/113525
§ 371 (c)(1),
(2) Date: Jun. 11, 2019

(87) PCT Pub. No.: WO2018/120028
PCT Pub. Date: Jul. 5, 2018

(65) Prior Publication Data
US 2019/0352844 A1    Nov. 21, 2019

(51) Int. Cl.
*D06M 16/00* (2006.01)
*A01N 25/10* (2006.01)
*A01N 59/16* (2006.01)
*D06M 15/356* (2006.01)

(52) U.S. Cl.
CPC ............ *D06M 16/00* (2013.01); *A01N 25/10* (2013.01); *A01N 59/16* (2013.01); *D06M 15/3562* (2013.01)

(58) Field of Classification Search
CPC .. D06M 16/00; D06M 15/3562; A01N 25/10; A01N 59/16
See application file for complete search history.

(56) References Cited

U.S. PATENT DOCUMENTS

| | | | |
|---|---|---|---|
| 5,698,229 A | 12/1997 | Ohsumi et al. | |
| 7,335,613 B2 * | 2/2008 | Cottrell | A01N 59/16 442/164 |
| 7,390,774 B2 | 6/2008 | Ghosh et al. | |
| 7,754,625 B2 | 7/2010 | Hendriks et al. | |
| 7,927,379 B2 | 4/2011 | Cottrell et al. | |
| 7,968,619 B2 | 6/2011 | Cottrell et al. | |
| 7,993,415 B2 | 8/2011 | Vogt et al. | |
| 8,679,931 B2 * | 3/2014 | Asai | C09J 201/00 438/114 |
| 2005/0227895 A1 | 10/2005 | Ghosh et al. | |
| 2007/0006391 A1 * | 1/2007 | Ghosh | D01F 1/103 8/115.51 |
| 2008/0115291 A1 | 5/2008 | Cottrell et al. | |
| 2011/0293546 A1 * | 12/2011 | Tanaka | A61K 8/24 424/61 |
| 2012/0126163 A1 * | 5/2012 | Ghosh | D06M 15/3562 252/8.63 |
| 2018/0347107 A1 | 12/2018 | Hussein et al. | |
| 2019/0141989 A1 * | 5/2019 | Vargo | D06M 15/3562 424/618 |

FOREIGN PATENT DOCUMENTS

| | | | | |
|---|---|---|---|---|
| CN | 102165960 A1 | 8/2011 | | |
| CN | 102294492 A1 | 12/2011 | | |
| EP | 2639259 A1 * | 9/2013 | ............ | C09J 11/04 |
| JP | H10316514 A | 12/1998 | | |
| JP | H11189505 A | 7/1999 | | |
| JP | 2001106961 A | 4/2001 | | |

\* cited by examiner

*Primary Examiner* — Angela C Brown-Pettigrew
*Assistant Examiner* — Preeti Kumar

(57) ABSTRACT

The present invention relates to a color stable treated fabric and the method for making the same.

16 Claims, No Drawings

COLOR STABLE TREATED FABRIC AND METHOD OF MAKING THE SAME

The present invention relates to a color stable treated fabric and the method for making the same.

Numerous biocides exist for incorporation into coating compositions, resin moldings, paper binders, and other polymeric materials to impart antimicrobial performance Two major classes of actives are organic (e.g. quaternary ammonium silanes) and inorganic (e.g. copper, silver, etc). Of the inorganic actives used most commonly is silver, or most specifically silver ion. Typical carriers are silver nanoparticles, silver salts, ion exchange resins, and glass.

Compositions containing the inorganic antimicrobials, specifically silver ions, are known to exhibit instabilities leading to discoloration upon exposure to heat, moisture and/or sun light. Discoloration has been previously discussed in U.S. Pat. No. 7,993,415B2 and U.S. Pat. No. 7,754,625B2. These inorganic biocides frequently produce color on lightly colored or white fabric making them less desirable. Accordingly, the use of these compositions is effectively limited to systems for which such conspicuous changes in coloration can be tolerated.

One method for inhibiting silver-related discoloration is provided by Ohsumi et al. in U.S. Pat. No. 5,698,229. Ohsumi et al. discloses the combination of an inorganic compound on which silver ions are supported with benzotriazole.

Another method for inhibiting discoloration is described by Ghosh et al. in U.S. Pat. No. 7,390,774. Ghosh et al. discloses a copolymer composing of a heterocyclic containing monomer which is said to complex with silver ions. The composition is light stable in the wet formulation. However, the color stability performance on the fabric, especially on nylon and polyester fabric, is not addressed. Surprisingly, an unacceptable color change was found for the treated fabric even under the upper limit of VI monomer to silver ion molar ratio disclosed in U.S. Pat. No. 7,390,774. The upper limit molar ratio disclosed is 21.77:1 based on the upper limit weight ratio of 95:5 of VI to silver ion.

Nevertheless, there remains a need for new compositions which exhibit the positive antibacterial activity of metal ions without influencing fabric hand/feel or color appearance which can result from undesirable light stability problems due to the metal (e.g. silver) and/or to the color of organic additives (e.g. polymers), especially across fabric compositions of cotton, polyester, nylon, and combinations thereof.

The present invention solves the problem in the art by providing a treated article comprising a fiber or fabric comprising at least one silver ion-polymer complex; comprising a monomer X selected from the group consisting of vinylimidazole, vinylimidazoline, vinylpyridine, vinylpyrrole, derivatives thereof and combinations thereof; and a transition metal; further wherein the molar ratio of monomer X to transition metal is from 22:1 to 117:1. The present invention also provides a method for making the same.

As used herein and in the appended claims, "fabric" means a woven or nonwoven textile such as cotton, polyester, nylon, lycra, polyolefin and blends thereof.

As used herein and in the appended claims, "fiber" refers to a unit of matter which is capable of being spun into a yarn or made into a fabric by bonding or by interlacing in a variety of ways including, for example, weaving, knitting, braiding, felting, twisting or webbing.

The term "yarn" as used herein refers to a strand of textile fiber in a form suitable for weaving, knitting, braiding, felting, twisting, webbing, or otherwise fabricating into a fabric As used herein and in the appended claims, the term "silver" refers to silver metal that is incorporated into an antimicrobial composition of the present invention. While not wanting to be bound as to the oxidation state of the silver ($Ag^0$, $Ag^{1+}$ or $Ag^{2+}$) that is incorporated into the antimicrobial composition, silver may be added to the antimicrobial composition by washing the polymer in a silver solution such as silver nitrate in deionized water ("DI"). Aside from DI, other liquid mediums can also be used such as water, aqueous buffered solutions and aqueous/organic solutions made with water misicible organics such as solvents such as alcohols, surfactants and softeners. Other sources of silver include but are not limited to silver acetate, silver citrate, silver chloride, silver iodide, silver lactate, silver picrate, silver oxide, and silver sulfate. The concentration of silver in these solutions can vary from the concentration required to add a known quantity of silver to the antimicrobial composition to a saturated silver solution.

The use of the term "(meth)" followed by another term such as acrylic, acrylate, acrylamide, etc., as used herein and in the appended claims, refers to, for example, both acrylic and (meth)acrylic; acrylate and methacrylate; acrylamide and methacrylamide; etc. Additionally any acids described in the reference herein also include the salt form and vice versa.

All percentages expressed herein are wt. % or ppm w/w. All range endpoints are inclusive and combinable.

According to the present invention there is provided a fabric comprising at least one transition metal polymer complex comprising at least one polymer and a transition metal.

The polymer of the present invention may suitably be a polymer comprising a) 60-90 wt % polymerized units of a monomer X; and (b) 10-40 wt % polymerized units of a monomer Y which is an ethylenically unsaturated compound.

Monomer X of the present invention may be imidazole; thiophene; pyrrole; oxazole; thiazoles and their respective isomers (e.g., thiazol-4-yl, thiazol-3-yl and thiazol-2-yl); tetrazole; pyridine; pyridazine; pyrimidine; pyrazine; azoles; indazoles; triazoles and their respective isomers (e.g., 1,2,3-triazole and 1,2,4-triazole); and combinations thereof, such as imidazole 1,2,3-triazole-1,2,4-triazole; benzotriazole; methyl-benzotriazole; benzothiazole; methylbenzothiazole; benzimidazole and methyl benzimidazole. In one aspect of this embodiment, the antimicrobial compositions of the present invention include a polymer comprising a heterocycle group selected from imidazole, benzotriazole and benzimidazole. Preferably, monomer X is N-vinylimidazole.

In some embodiments of the present invention, monomer Y is selected from carboxylic acids, organosulfuric acids, sulfonic acids, phosphonic acids and esters of polymerized units of ethylene oxide and combinations thereof. In some embodiments of the invention, esters comprising polymerized units of ethylene oxide comprise at least 2 units of ethylene oxide, alternatively at least 3, alternatively at least 4, alternatively at least 5, alternatively at least 6. The number of polymerized ethylene oxide units is calculated from the Mn of the polymerized ethylene oxide chain. In some embodiments of the invention, the esters of polymerized units of ethylene oxide are (meth)acryloyl esters. In some embodiments of the invention, polymerized units of ethylene oxide may be capped with a $C_1$-$C_6$ alkyl group on one end. In some embodiments of the invention, polymerized units of ethylene oxide have Mn from 100 to 3000. In some embodiments of the invention, the polymerized units of ethylene oxide have Mn from 200 to 1000, alternatively from 250 to 600, alternatively from 300 to 500.

In some embodiments of the invention, monomer Y is selected from acrylic acid (AA), methacrylic acid (MAA), itaconic acid, maleic acid, fumaric acid, 2-acrylamido-2-methylpropanesulfonic acid and its sodium salt and combinations thereof. In some aspects of these embodiments, the copolymer further comprises other ethylenically unsaturated monomers, e.g., (meth)acrylate esters, vinyl esters, (meth) acrylamides. Small amounts of hydrophobic monomers, e.g., higher alkyl (meth)acrylates (e.g., C-4 and higher), may be present to the extent they do not compromise water solubility. (Meth)acrylate esters may include esters of mixed ethylene/propylene oxides, providing that ethylene oxide residues are at least 50 wt % of the ethylene/propylene oxide residues (alternatively at least 75%, alternatively at least 90%) or that the esters of mixed ethylene/propylene oxide residues are no more than 20 wt % of the copolymer, alternatively no more than 15%, alternatively no more than 10%. In some embodiments of the invention, mixed ethylene/propylene oxide residues have Mn of at least 150, alternatively at least 300.

Alternatively, more than one polymer may be combined in the polymer complex of the present invention. Suitably, a second polymer may be a polymer comprising: (a) polymerized units of the monomer X; and (b) polymerized units of monomer Z wherein monomer z is a non-heterocyclic saturated compound selected from acrylic acid, (meth)acrylic acid, ethyl acrylate, and butyl acrylate and combinations thereof. The polymer comprises X and Z in a ratio of 95:5 to 5:95; alternatively 80:20 to 20:80; alternatively 60:40 to 40:60. Butyl acrylate is present in the copolymer in the amount from 5% to 50%, alternatively from 5% to 40%, and further alternatively from 5% to 25%. Acrylic acid is present in the copolymer in the amount from 5% to 30%, alternatively 5% to 20%, alternatively 5% to 10%.

According to the present invention the first and second polymers may be present independently, may be present together, and present with or without additional polymers.

At least one transition metal combines with at least one polymer to form a transition metal polymer complex. Suitable transition metals include, but are not limited to copper, zinc, gold, silver, tin, and combinations thereof. Suitably, the transition metal is silver. When the transition metal is silver in the transition metal polymer complex, silver may be present on the fiber or fabric at a silver concentration of 10-100 ppm, alternatively 15-80 ppm, further alternatively 20-50 ppm.

A critical aspect of the present invention is the molar ratio of monomer X to silver. Suitably the ratio of monomer X to silver is from 22:1 to 117:1, alternatively from 31:1 to 117:1, further alternatively from 48:1 to 117:1, further alternatively from 61:1 to 117:1, further alternatively from 22:1 to 61:1, further alternatively 24:1 to 61:1, further alternatively 31:1 to 61:1, and further alternatively from 48:1 to 61:1. When monomer X is present in multiple polymers, the total amount of monomer X from all sources is considered for the ratio calculation of monomer X to silver molar ratio.

This polymer complex is formulated by conventional means in the art and applied to a fiber or fabric to create a treated article. Suitable fabrics include cotton, polyester, and nylon, and alternatively polyester and nylon, and combinations thereof. Exhaustion and conventional padding processes are examples of suitable methods that may be used to apply the polymer complex to the fabric in the present invention. The preferred method of the present invention is padding. Following the application of polymer complex, the fabric may then be dried. Conventional drying methods may be used. The fabric is said to be "dry" when the weight of the fabric is equal to its initial weight before the drying treatment. In one embodiment of the present invention, the treated fabric is dry.

Some embodiments of the present invention will now be described in detail in the following Examples. All fractions and percentages set forth below in the Examples are by weight unless otherwise specified.

EXAMPLES

Materials and Methods Used to Prepare a Treated Fabric

TABLE 1

Chemicals used for Producing Antimicrobial Concentrate Formulations

| Ingredient | Source | Description |
| --- | --- | --- |
| QR-1719 polymer (32% by weight) | The Dow Chemical Company | 45VI/40BA/15AA |
| QR-1831 polymer (30% by weight) | The Dow Chemical Company | 75VI/25PEGMA |
| Silver Nitrate | Sigma Aldrich | Reagent #209139 |
| Ammonium hydroxide (28%) | EMD Millipore | 105423 |

TABLE 2

Textiles/Fabrics used for Testing

| Fabrics | Description | WPUR |
| --- | --- | --- |
| Polyester | SDL Atlas - Item # 400000: TIC 730 100% Polyester Interlock Knit | ~100% |
| Cotton | SDL Atlas - Item # 200789: TIC 460 100% Cotton Interlock Knit | ~100% |
| Nylon | SDL Atlas: TIC 300 100% Spun Nylon 6.6 Plain Weave | ~125% |

Methods

Fabric Treatment

A Lab scale padding machine from Werner Mathis AG (Model: CH-8155 VFM28888) was used to apply the antimicrobial compositions to fabric samples.

First, as standard in the field, fabric wet-pick up rate (WPUR) is determined to calculate the concentration of silver ion-polymer complex solution needed to achieve a target silver ion loading on the dried textile. The roller pressure is set to 3 barg initially. Then a 12" by 16" swatch of fabric is weighed out. Most fabric swatches will weigh between 10 to 15 grams. Polyester is typically 12 grams and heavy cotton is typically 15 grams. The swatch is soaked in a deionized water bath for 3 to 8 seconds until it has fully absorbed the water Immediately after, the wet fabric is passed through the spinning rollers at the 3 barg pressure setting. The fabric is then reweighed to determine the weight increase due to water absorption. The WPUR is calculated by the difference in the weight of the wet fabric after going through the rollers and the dried fabric weight divided by the dried fabric weight. Polyester fabric used here typically weighed around 24 grams after and 12 grams before affording a wet pick-up rate of (24-12)/12 or ~100%. Cotton typically weighs 15 grams dried and 30 grams after the roller for a calculated wet pick-up rate of (30-15)/15 or ~100%. Nylon typically weighed 12 grams dried and 27 grams after the roller for a calculated wet pick-up rate of (27-12)/12 or ~125%. If the wet pick-up rate does not match the desired value, the pressure of the padding rollers can be adjusted up or down to achieve the desired values. Fabric source and composition will directly impact the WPUR and should be determined in order to achieve the target silver ion fabric concentration.

Second, the application bath solutions are prepared to treat each textile swatch or fabric. The silver ion concentration in the bath is calculated based on the initial silver ion concentrate solution and the wet pick-up rate. The calculation of bath concentration of an antimicrobial formulation is calculated by dividing the target silver ion level by the active loading in the antimicrobial formulation and then dividing by the wet pick-up rate. For example, to target a theoretical 30 ppm of silver on polyester fabric with a 100% wet pick-up rate using an antimicrobial formulation with 1000 ppm of silver, one would divide 30 ppm Ag target/1000 ppm Ag in formulation/(1.0 WPUR*100), which is equivalent to 3 g antimicrobial concentrate formulation in 97 g of water. For the purposes of this invention, cotton and polyester treatments across all antimicrobial concentrate formulations (Table 3, 1-13) distinguished by varying VI:Ag+ molar ratios, were utilized similarly due to similar WPUR. The exception was for nylon fabric samples which achieved approximately 125% wet pick-up rate, the calculation was 30 ppm Ag target/1000 ppm Ag antimicrobial formulation/1.25 WPUR*100, or 2.4 g antimicrobial concentrate formulation in 97.6 g of water.

The 30 ppm silver target fabric loading for cotton and polyester would be simply formulated by weighing out 3 grams of the antimicrobial concentrate formulation and mixing it into 97 grams of deionized water, and for nylon by weighing out 2.4 grams of antimicrobial concentrate formulation and mixing into 97.6 grams of deionized water. Due to silver ion-polymer complex stronger affinity to nylon versus cotton and polyester, baths were prepared at ~15 ppm silver (or 1.5 grams of antimicrobial concentrate formulation) instead of 24 ppm to match desired fabric concentrations of approximately 30 ppm silver ion. For all fabrics used as controls (without antimicrobial treatment), fabrics were processed using water alone and are designated so in subsequent tables.

Lastly, the treatment of each fabric was carried out in the padding machine using the pressure settings determined above to achieve the desired wet pick-up rate for each fabric swatch. Each silver solution was poured into the trough on the padding machine prior to treatment. Then fabric samples were dipped into silver solutions for 3 to 8 seconds until soaked Immediately, the wet fabric was then passed through the rollers to achieve the desired wet pick-up weights. Then fabrics were placed onto a device that stretches the fabric taught and dried in a convection oven at 150° C. for 2 minutes.

Antimicrobial Concentrate Formulations:

Antimicrobial concentrate formulations 1-10 supporting VI:Ag+ molar ratios from 4 to 117 are depicted in Table 3. Each of the antimicrobial formulation examples contains approximately 1000 ppm or approximately 200 ppm of silver ion which is added as a solution of 50% silver nitrate in water. Each of the formulations were prepared by combining the water and polymer(s) together and mixing thoroughly first. Then adding the ammonia, which is a 28% concentration of ammonia in water. Lastly, the silver nitrate solution is slowly mixed into the polymer solutions to achieve a clear single phase solution.

TABLE 3

1000 pm Silver Ion Concentrated Antimicrobial Formulations 1-10

| Component | 1 | 2 | 3 | 4 | 5 | 6 | 7 | 8 | 9 | 10 |
|---|---|---|---|---|---|---|---|---|---|---|
| DI Water | 95.67 | 93.72 | 90.01 | 88.14 | 85.33 | 83.46 | 78.7 | 74.02 | 69.34 | 52.57 |
| NH3 (28%) | 1.70 | 1.70 | 1.70 | 1.70 | 1.70 | 1.70 | 1.70 | 1.70 | 1.70 | 1.70 |
| QR-1719 (32%) | 2.32 | 2.32 | 2.32 | 2.32 | 2.32 | 2.32 | 2.32 | 2.32 | 2.32 | 2.32 |
| QR-1831 (30%) | 0 | 1.95 | 5.66 | 7.53 | 10.34 | 12.21 | 16.97 | 21.65 | 26.33 | 43.1 |
| AgNO3 (50%) | 0.31 | 0.31 | 0.31 | 0.31 | 0.31 | 0.31 | 0.31 | 0.31 | 0.31 | 0.31 |
| Total | 100.00 | 100.00 | 100.00 | 100.00 | 100.00 | 100.00 | 100.00 | 100.00 | 100 | 100 |
| ~VI:Ag+ | 4 | 9 | 19 | 24 | 31 | 36 | 48 | 61 | 73 | 117 |

TABLE 4

200 pm Silver Ion Concentrated Antimicrobial Formulations 11-13

| Component | 11 | 12 | 13 |
|---|---|---|---|
| DI Water | 382.7 | 306.3 | 115.5 |
| NH3 (28%) | 1.7 | 1.7 | 1.7 |
| QR-1719 (32%) | 2.32 | 2.32 | 2.32 |
| QR-1831 (30%) | 113.0 | 189.3 | 380.2 |
| AgNO3 (50%) | 0.31 | 0.31 | 0.31 |
| Total | 500 | 500 | 500 |
| ~VI:Ag+ | 300 | 500 | 1000 |

Fabric Weathering

All fabrics were aged in a climate chamber (Model: KBWF 720 climate chamber, Binder Company) to accelerate color change. The 12" by 16" treated swatches of fabric were cut in half lengthwise to produce two strips of 6" by 16". One strip was used in the climate chamber by first covering half of the sample, or about 6" by 8", using a light-proof paper card on both sides and leaving the other have uncovered and exposed. Those strips were hung vertically inside the chamber. The chamber was then set to 30° C. and cycled humidity as follows: 30% relative humidity for 4 hours, 2 hour transition from 30% to 90%, hold at 90% for 4 hours, 2 hour transition from 90% to 30%, and repeated. This weathering cycle was repeated for 3 weeks.

The light source was a LUMILUX Cool Daylight (OSRAM L36w/865 lighting bulb) which was kept on during the weathering process.

Color Measurement

The color of fabrics after weathering was measured using a Hunterlab Spectrophotometer (Model: Labscan XE) with illumination from a pulsed xenon arc source, a 0 degree illumination angle and a 45 degree viewer angle with a 13 mm (0.5") measuring area. Measurements were performed on 2 layers of the experimental fabrics using standard white tile as the backing. The untreated standard cotton, polyester, or nylon were used as control fabric to which all experimental fabric samples were compared to evaluate total color change (ΔE*ab) or by ISO Grey Scale interpretation. Larger ΔE*ab corresponds with greater fabric color change. For ISO analysis, the scale is 1-5, with 5 representing minimal to no color change. ISO Grey Scale readings are an output of the spectrophotometer. The calculation of ΔE*ab is based on the measurements of L, a, and b which describe the coordinate space of light/dark, red/green, and blue/yellow. The ΔE*ab value is calculated as the square root of the sum of square differences between the measured sample values and the control sample.

$$\Delta E_{cb} = \sqrt{(L_i - L_0)^2 + (a_i - a_0)^2 + (b_i - b_0)^2}$$

Where the subscript 0 represents the control sample values and i represents the individual sample measurement. Each fabric swatch was measured a three locations and averages of L, a, and b values were used on the ΔE*ab calculations.

ΔE*ab below approximately 1.3 or ISO Grey Scale readings equal to or greater than 4.5 are preferred.

Antimicrobial Performance Testing

The fabrics were cut into 0.4 g samples, and placed in sterile 50 mL conical tubes. The samples were inoculated with 200 μl *Escherichia coli* ATCC 8739 inoculum. Samples were tested in triplicate, and one set of unpreserved samples was enumerated immediately after inoculation. The remainder of the bacterial samples were incubated at 37° C. and enumerated 24 hours post-inoculation. Bacteria were enumerated by adding 20 mL of Dey-Engley Neutralizing Broth to the samples and vortexing for 25 seconds. Aliquots of the cell suspensions were taken and enumerated using the Most Probable Number (MPN) method. (Modified ISO 20743 Antimicrobial Efficacy Test).

Qualitative Hand/Feel Test

Seven randomly selected panelists were given fabrics treated at various VI to Ag+ ratios using polymer and silver ion. Control fabrics were prepared using process water from tap without polymer or silver ion. Panelists were asked to compare hand feel changes relative to the process water treated polyester and nylon swatches or fabrics. The two categories of feedback were: 1) harder hand/feel than reference, 2) Same hand/feel as reference.

Experiments and Results

TABLE 5

Comparative Example 1 Cotton, nylon and polyester fabric discoloration at molar ratios less than 22 moles VI/mol silver ion

| Fabric Type | Molar Ratio (VI:Ag+) | 3 Week Discoloration | | |
|---|---|---|---|---|
| | | Average dE* | Standard Deviation dE* | ISO Grey Scale |
| Cotton | Process Water (Control) | 0.85 | 0.01 | 5 |
| Cotton | 4:1 | 1.57 | 0.05 | 4 |
| Polyester | Process Water (Control) | 0.89 | 0.089 | 4.5 |
| Polyester | 4:1 | 2.94 | 0.047 | 3.5 |
| Polyester | 9:1 | 2.65 | 0.036 | 3.5 |
| Nylon | Process Water (Control) | 0.82 | 0.08 | 4.5 |
| Nylon | 9:1 | 5.16 | 0.41 | 2.5 |

Note: ΔE*ab (Aged vs untreated) is a measurement of color stability by comparing the color difference for the treated fabrics against untreated fabric over time. Comparative example 1 demonstrates yellowing (discoloration) associated with compositional define treatments on polyester, nylon, and cotton.

TABLE 6

Inventive example 2 depicting discoloration performance at VI:Ag+ molar ratios greater than 4:1 for cotton.

| Fabric Type | Molar Ratio (VI:Ag+) | 3 week Discoloration | | |
|---|---|---|---|---|
| | | Average dE* | Standard Deviation dE* | ISO Grey Scale |
| Cotton | Process Water (Control) | 0.85 | 0.01 | 5 |
| Cotton | 9:1 | 0.61 | 0.02 | 4.5 |
| Cotton | 19:1 | 0.29 | 0.03 | 5 |
| Cotton | 24:1 | 0.24 | 0.03 | 5 |
| Cotton | 31:1 | 0.23 | 0.01 | 5 |

TABLE 7

Inventive Example 3 depicting discoloration performance at molar ratios greater than 4:1 for polyester.

| Fabric Type | Molar Ratio (VI:Ag+) | Silver Ion (ppm) | 3 week Discoloration | | | Antimicrobial Performance | Same Hand/Feel |
|---|---|---|---|---|---|---|---|
| | | | Average dE* | Standard Deviation dE* | ISO Grey Scale | | |
| Polyester | Process Water | — | 0.89 | 0.089 | 4.5 | — | — |

TABLE 7-continued

Inventive Example 3 depicting discoloration performance at molar ratios greater than 4:1 for polyester.

| Fabric Type | Molar Ratio (VI:Ag+) | Silver Ion (ppm) | 3 week Discoloration | | ISO Grey Scale | Antimicrobial Performance | Same Hand/Feel |
|---|---|---|---|---|---|---|---|
| | | | Average dE* | Standard Deviation dE* | | | |
| | (Control) | | | | | | |
| Polyester | 9:1 | 29 | 2.65 | 0.036 | 3.5 | >2.09 | 6/7 |
| Polyester | 19:1 | 33 | 2.21 | 0.105 | 3.5 | >4.35 | 6/7 |
| Polyester | 24:1 | 32 | 1.69 | 0.107 | 4 | >3.43 | 6/7 |
| Polyester | 31:1 | 34 | 1.24 | 0.035 | 4.5 | >2.84 | 6/7 |
| Polyester | 36:1 | 34 | 1.32 | 0.015 | 4 | >3.75 | 6/7 |
| Polyester | 48:1 | 35 | 0.95 | 0.017 | 4.5 | 4.15 | 6/7 |
| Polyester | 61:1 | 36 | 0.86 | 0.025 | 4.5 | 3.45 | 6/7 |

TABLE 8

Inventive example 3 depicting discoloration performance at molar ratios greater than 4:1 for nylon.

| Fabric Type | Molar Ratio (VI:Ag+) | Silver Ion (ppm) | 3 week Discoloration | | ISO Grey Scale | Antimicrobial Performance | Same Hand/Feel |
|---|---|---|---|---|---|---|---|
| | | | Average dE* | Standard Deviation dE* | | | |
| Nylon | Process Water (control) | — | 0.82 | 0.08 | 4.5 | — | — |
| Nylon | 9:1 | 33 | 5.16 | 0.41 | 2.5 | 2.91 | 6/7 |
| Nylon | 19:1 | 30 | 1.39 | 0.20 | 4 | >4.56 | 6/7 |
| Nylon | 24:1 | 31 | 1.37 | 0.30 | 4 | >3.64 | 6/7 |
| Nylon | 31:1 | 28 | 1.57 | 0.14 | 4 | >3.05 | 6/7 |
| Nylon | 36:1 | 28 | 1.35 | 0.21 | 4 | >3.96 | 6/7 |
| Nylon | 48:1 | 24 | 1.36 | 0.19 | 4.5 | 4.56 | 6/7 |
| Nylon | 61:1 | 27 | 1.26 | 0.19 | 4.5 | 3.86 | 6/7 |

TABLE 9

Inventive example depicting initial visible fabric color and hand/feel across VI/Ag+ molar ratios up to 1000:1.

| Fabric Type | VI/Ag+ ratio | Initial Color | Hand feel Test* | |
|---|---|---|---|---|
| | | | Hard hand feel | Same hand feel |
| Nylon | Process Water (Control) | — | — | — |
| | 9:1 | same | 1/7 | 6/7 |
| | 48:1 | same | 1/7 | 6/7 |
| | 117:1 | same | 4/7 | 3/7 |
| | 300:1 | Yellower | 7/7 | 0 |
| | 500:1 | Yellower | 7/7 | 0 |
| | 1000:1 | Yellower | 7/7 | 0 |
| Polyester | Process Water (Control) | same | — | — |
| | 9:1 | same | 2/7 | 5/7 |
| | 48:1 | same | 3/7 | 4/7 |
| | 117:1 | same | 4/7 | 3/7 |
| | 300:1 | Yellower | 7/7 | 0 |
| | 500:1 | Yellower | 7/7 | 0 |
| | 1000:1 | Yellower | 7/7 | 0 |

We claim:

1. A transition metal-polymer complex treated article comprising:
a first polymer comprising
polymerized units of a monomer X, wherein the monomer X is vinylimidazole, and polymerized units of a monomer Y, wherein the monomer Y is at least one ester of polymerized units of ethylene oxide, and
a second polymer comprising
polymerized units of the monomer X and polymerized units of a monomer Z, wherein the monomer Z is a non-heterocyclic saturated compound selected from acrylic acid, (meth)acrylic acid, ethyl acrylate, butyl acrylate and combinations thereof, and
a transition metal, wherein the transition metal is silver ion;
wherein the molar ratio of monomer X to transition metal is from 24:1 to 117:1, said molar ratio being calculated based on the total amount of monomer X from all monomer X sources combined with the transition metal.

2. The treated article of claim 1, wherein the treated article is a fiber or fabric.

3. The treated article of claim 1 wherein the molar ratio of monomer X to transition metal is from 31:1 to 117:1.

4. The treated article of claim 1 wherein the treated article is a fabric chosen from cotton, nylon, polyester, and combinations thereof.

5. A method for treating a fiber or fabric comprising:
a) providing a fiber or fabric;
b) providing a transition metal-polymer complex solution comprising:
a first polymer comprising polymerized units of a monomer X, wherein the monomer X is vinylimidazole, and polymerized units of a monomer Y, wherein the monomer Y is at least one ester of polymerized units of ethylene oxide, and a second polymer comprising polymerized units of the monomer X and polymerized units of a monomer Z, wherein the monomer Z is a non-heterocyclic saturated compound selected from acrylic acid, (meth)acrylic acid, ethyl acrylate, butyl acrylate and combinations thereof, and a transition metal, wherein the transition metal is silver ion, wherein the molar ratio of monomer X to transition metal is from 24:1 to 117:1, said molar ratio being calculated based on the total amount of monomer X from all monomer X sources combined with the transition metal; and c) contacting the fiber or fabric with the transition metal-polymer complex solution.

6. The method of claim 5, wherein the molar ratio of monomer X to silver ion is from 31:1 to 117:1.

7. The treated article of claim 1, wherein the first polymer comprises from 60 to 90 wt % of polymerized units of the monomer X and from 10 to 40 wt % of polymerized units of the monomer Y.

8. The treated article of claim 7, wherein the treated article is a fabric chosen from cotton, nylon, polyester, and combinations thereof.

9. The method of claim 5, wherein the first polymer comprises from 60 to 90 wt % of polymerized units of the monomer X and from 10 to 40 wt % of polymerized units of the monomer Y.

10. The method of claim 9, wherein the fabric is chosen from cotton, nylon, polyester, and combinations thereof.

11. The treated article of claim 1, wherein the ester of polymerized units of ethylene oxide is at least one (meth)acryloyl ester.

12. The treated article of claim 11, wherein the ethylene oxide is in a mixture with propylene oxide, wherein residues of ethylene oxide constitute at least 50 wt % based on the total weight of residues of the mixture.

13. The method of claim 5, wherein the ester of polymerized units of ethylene oxide is at least one (meth)acryloyl ester.

14. The method of claim 13, wherein the ethylene oxide is in a mixture with propylene oxide, wherein residues of ethylene oxide constitute at least 50 wt % based on the total weight of residues of the mixture.

15. The treated article of claim 1 wherein the molar ratio of monomer X to transition metal is from 24:1 to 61:1.

16. The method of claim 5 wherein the molar ratio of monomer X to transition metal is from 24:1 to 61:1.

* * * * *